(No Model.)
W. CARDWELL.
WAGON BRAKE LEVER.
No. 303,264. Patented Aug. 12, 1884.
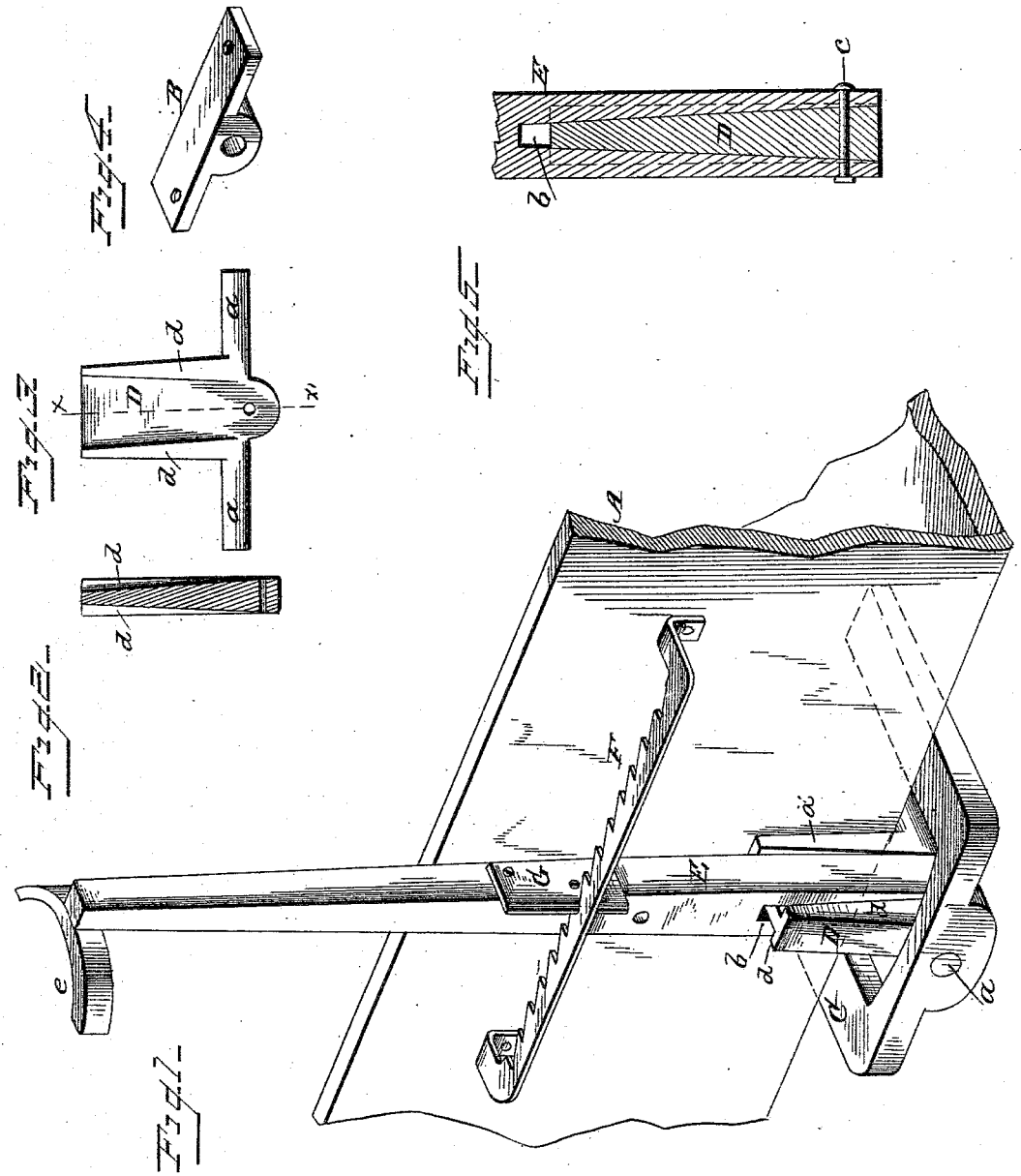
WITNESSES
F. L. Ourand
L. L. Miller
INVENTOR
William Cardwell,
per Chas. H. Fowler
Attorney

UNITED STATES PATENT OFFICE.

WILLIAM CARDWELL, OF ST. JOSEPH, MISSOURI.

WAGON-BRAKE LEVER.

SPECIFICATION forming part of Letters Patent No. 303,264, dated August 12, 1884.

Application filed May 31, 1884. (No model.)

*To all whom it may concern:*

Be it known that I, WILLIAM CARDWELL, a citizen of the United States, residing at St. Joseph, in the county of Buchanan and State of Missouri, have invented certain new and useful Improvements in Wagon-Brakes; and I do hereby declare that the following is a full, clear, and exact description of the same, reference being had to the annexed drawings, making a part of this specification, and to the letters and figures of reference marked thereon.

Figure 1 of the drawings is a perspective view of my invention, showing it connected to a wagon-body; Fig. 2, a sectional view of the pivoted clutch, taken on line $x$ $x$ of Fig. 3; Fig. 3, a side elevation thereof; Fig. 4, a detail view in perspective of the bearing-plate, to which is connected one of the journals of the clutch; and Fig. 5, a cross-section taken through the clutch and lever.

The present invention has relation to certain new and useful improvements in the means for operating the brake-shoes of wagons or other vehicles; and it consists in the details of construction, substantially as shown in the drawings, and hereinafter described and claimed.

In the accompanying drawings, A represents a portion of a wagon-body, to the under side of which are suitably connected the bearing-plate B and bracket C, said bracket extending out from the side of the wagon-body, and, together with the plate B, forming bearings for journals $a$ upon a clutch, D. This clutch is formed wedge shape, as shown in Fig. 2, over which fits the lower end of a lever, E, formed with a wedge-shape bifurcation, $b$, thus enabling the end of the lever, which is pivoted at $c$ to the clutch, to work thereon without binding, and making a more perfect joint without the danger of any foreign substance working in between the bifurcated end of the lever and the sides or faces of the clutch.

The clutch D, if preferred, may be provided with flanges $d$ upon both its sides, to form stops to limit the motion of the lever with relation to said clutch; but this, however, is not essential, and may be used or not, as found desirable.

The lever E extends up within reach of the driver, and is provided with a stirrup, $e$, for operating it with the foot.

A toothed bar, F, is connected to the wagon-body A, between which and the bar the lever is located, the latter having a pawl, G. This pawl and bar operate, as in the ordinary pawl and ratchet, to hold the lever stationary in releasing or putting on the brake.

The brake-shoes are of the usual form, and connected in the ordinary manner to jointed rods, which are in turn connected to the lever E, and these features forming no part of the invention, it is not considered necessary to illustrate them.

It will be noticed that the pawl G is of sufficient length to engage with the teeth on the bar F at any point on the arc of a circle described by the lever.

The lever E is connected in such manner by means of the pivoted clutch D as to provide a double joint, thus admitting of the lever having a double motion—viz., lengthwise of the bar F and transversely therewith—when it is desired to release the pawl from engagement with the teeth of the bar, or, in other words, a longitudinal and lateral play.

It is evident that the bearings for the journals of the clutch may be variously modified or changed, as circumstances require, without departing from the spirit of my invention; and any suitable pawl-and-ratchet device for holding the lever stationary may be substituted for the means shown, this also being a feature susceptible to change or modification.

Having now fully described my invention, what I claim as new, and desire to secure by Letters Patent, is—

1. The means, substantially as herein described, for operating the brakes of wagons or other vehicles, consisting of a pivoted clutch, a suitable lever having a bifurcation at its lower end, extending over the clutch and pivoted thereto, and a pawl-and-ratchet device for holding the lever stationary, for the purpose set forth.

2. In a wagon-brake, a pivoted clutch formed wedge shape, in combination with a bifurcated lever pivoted thereto, and carrying a stirrup and pawl, the latter adapted to engage with a toothed bar connected to the wagon-body, substantially as and for the purpose specified.

3. In a wagon-brake, a flanged and pivoted clutch, in combination with a bifurcated lever pivoted thereto, and a pawl-and-ratchet device for holding the lever stationary, substantially as and for the purpose described.

In testimony that I claim the above I have hereunto subscribed my name in the presence of two witnesses.

WILLIAM CARDWELL.

Witnesses:
JOHN D. PRESTON,
JOHN P. ARNOLD.